United States Patent [19]
Abbott

[11] Patent Number: 6,033,179
[45] Date of Patent: Mar. 7, 2000

[54] TRUCK BED CLEAN OUT APPARATUS AND METHOD

[76] Inventor: William S. Abbott, 23210 SE. 24th, Issaquah, Wash. 98029

[21] Appl. No.: 09/150,992

[22] Filed: Sep. 10, 1998

Related U.S. Application Data

[60] Provisional application No. 60/058,689, Sep. 12, 1997.

[51] Int. Cl.[7] ........................................... B60P 1/00
[52] U.S. Cl. .............................................. 414/527
[58] Field of Search ................. 414/525.1, 525.9, 414/527, 507, 509, 514, 518, 515, 516, 517, 812, 813, 502; 298/1 B; 198/750.1, 750.2, 773, 950, 860.5, 312

[56] References Cited

U.S. PATENT DOCUMENTS

| | | | |
|---|---|---|---|
| 1,485,631 | 3/1924 | Shea | 414/509 X |
| 2,033,209 | 9/1935 | Teetor . | |
| 3,826,534 | 7/1974 | Ruff . | |
| 3,978,996 | 9/1976 | Oltrogge . | |
| 4,277,220 | 7/1981 | Wiley . | |
| 4,629,390 | 12/1986 | Burke . | |
| 4,948,325 | 8/1990 | Hodgetts | 414/527 |
| 4,979,865 | 12/1990 | Strickland . | |
| 5,156,518 | 10/1992 | VanMatre . | |
| 5,340,266 | 8/1994 | Hodgetts . | |

FOREIGN PATENT DOCUMENTS

| | | | |
|---|---|---|---|
| 96307 | 7/1939 | Sweden | 414/527 |

*Primary Examiner*—Frank E. Werner
*Attorney, Agent, or Firm*—William G. Forster

[57] ABSTRACT

The invention is a clean-out apparatus for use in a trailer of the type having a reciprocating floor conveyor system for conveying and unloading large quantities of granular material. The clean-out apparatus is designed to minimize the residual granular material that remains on the reciprocating floor of the truck after the floor is reciprocated to unload the granular material. The clean-out apparatus comprises a reel adapted for rotatable support from the trailer, adjacent the forward end wall thereof, and a flexible clean-out cover movable from a first retracted position where it is coiled around the reel to a second uncoiled extended position adjacent the rear door opening. Importantly, when the clean-out cover is in the first retracted position, it is disposed such that a portion thereof extends over the reciprocating floor, under a portion of the granular material adjacent the forward end wall of the trailer. With this arrangement, the clean-out cover moves from the first retracted position to the second extended position responsive to frictional engagement with the reciprocating floor as the same is reciprocated to convey the granular material rearward through the rear door opening. Conversely, the clean-out cover is movable from the second extended position to the first retracted position responsive to rotation of the reel following the unloading of the granular material.

24 Claims, 5 Drawing Sheets

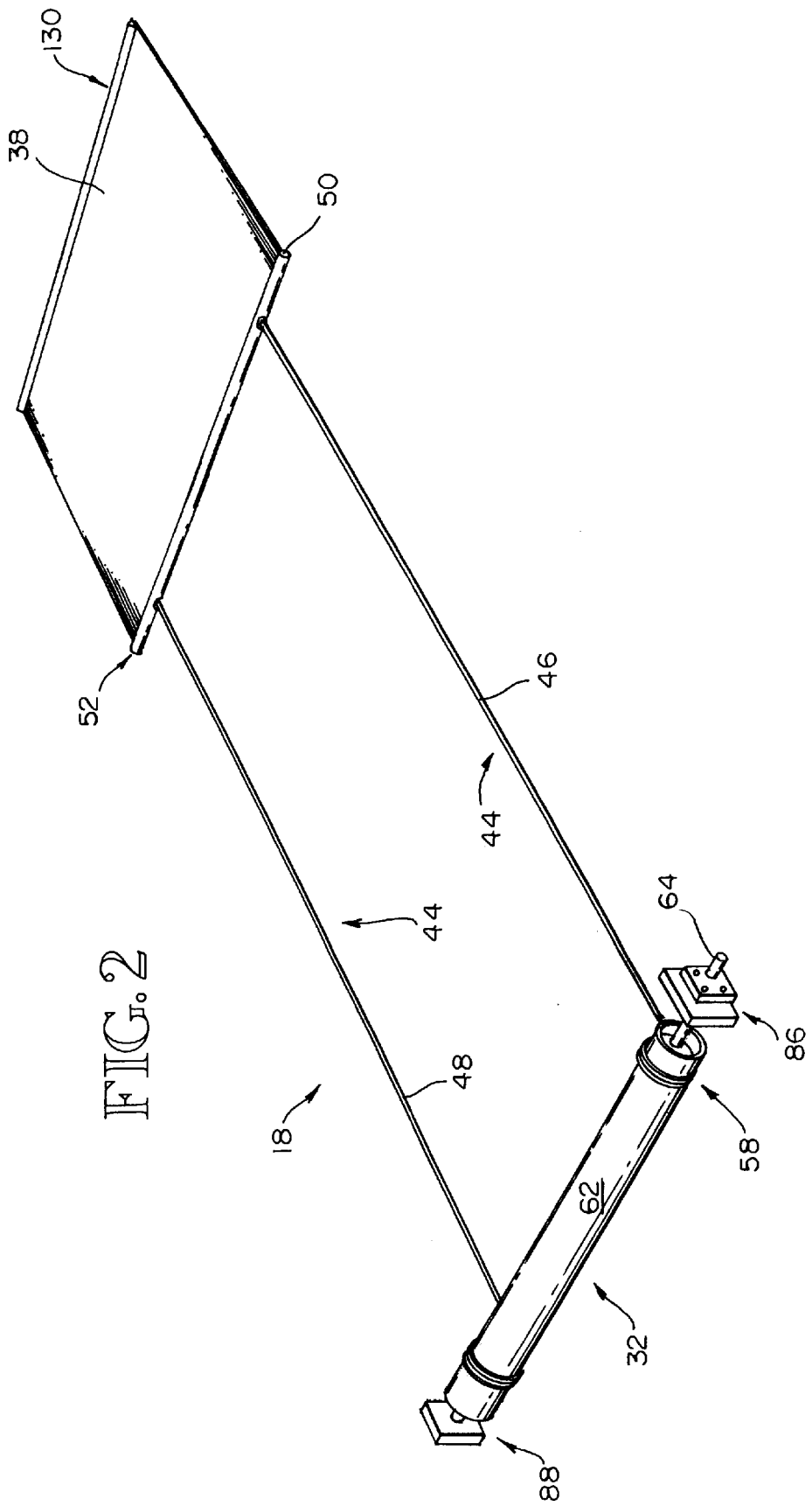

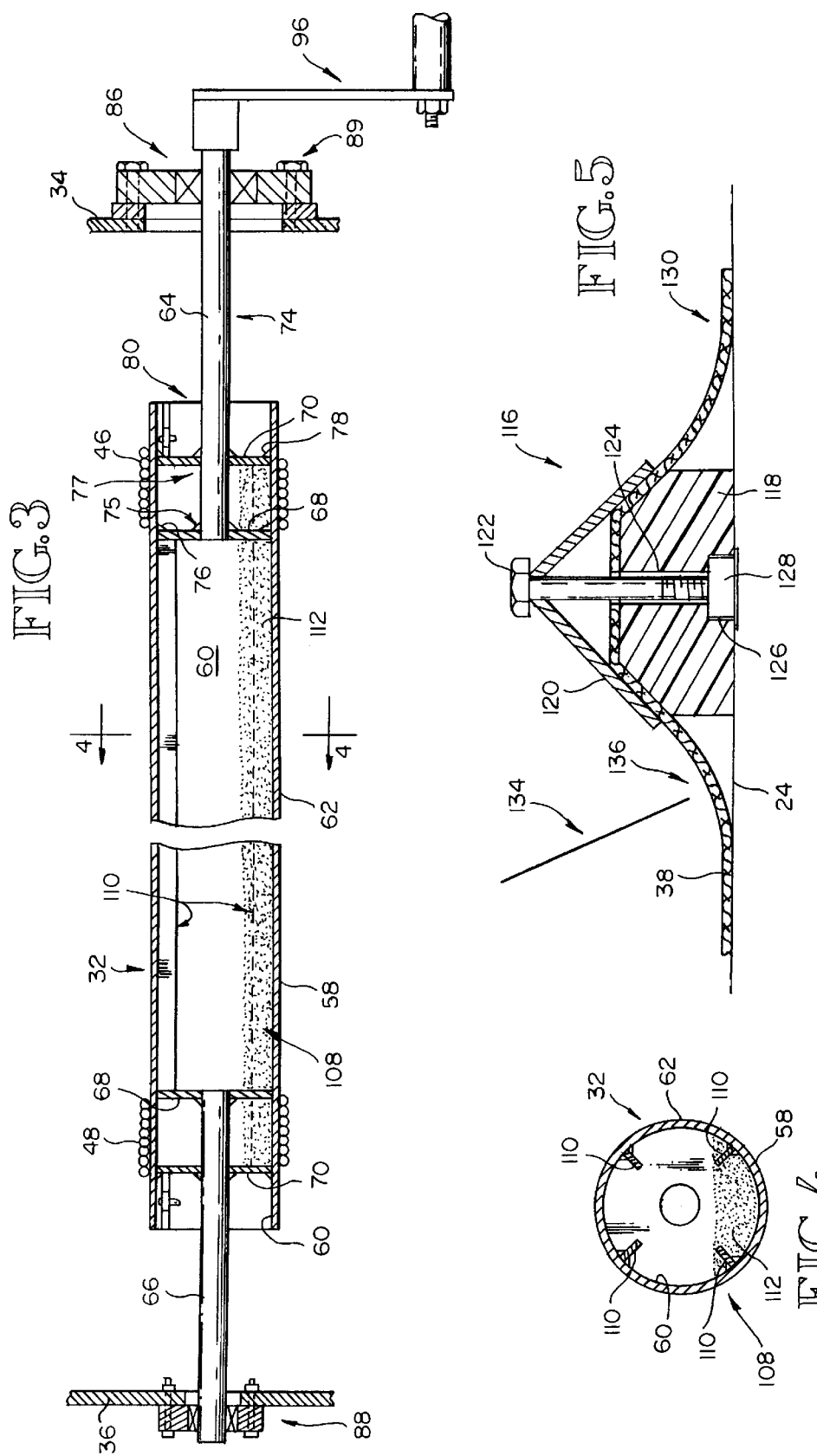

TRUCK BED CLEAN OUT APPARATUS AND METHOD

This application claims the benefit of U.S. Provisional Application No. 60/058,689 Filed Sep. 12, 1997.

BACKGROUND

This invention relates generally to trucks and trailers of the type having a reciprocating floor system for transporting and off-loading loads of granular material, and more particularly to apparatus for minimizing the amount of residual granular material that remains on a reciprocating floor after the offloading process is completed.

Apparatus directed to assist in the unloading process of granular material loads from trucks are known in the art. Two early devices provided for this purpose are U.S. Pat. No. 2,033,209 issued to Teetor in 1935 that discloses a tiltable dumping unit mounted within a truck bed for receiving a material load, the dumping unit being tilted to remove the load. Similarly U.S. Pat. No. 3,826,534 issued Ruff in 1974 discloses a dump body pivotally placed within a truck body to receive a material load that is removed upon pivoting action of the dump body. These designs employ motorized mechanisms that must be powerful enough to lift and tilt the entire material load.

Several later designs incorporated various types of flexible belts or sheets that are wound around a reel to remove a material load. For example U.S. Pat. No. 3,978, 996 issued to Oltrogge 1976 discloses a flexible conveyor belt upon which a material load is placed, wherein the material is removed by a winch powered drum roller that pulls and reels the belt rearward thereby urging and removing the material load from the rear of the truck.

U.S. Pat. No. 4,277,220 issued to Wiley in 1981 discloses an unloader having a flexible apron that is wound rearwardly over a material load placed thereon by a winch to generate a rearward tumbling and conveying action on the load material to urge the same from the truck.

Similarly U.S. Pat. No. 4,629,390 issued to Burke in 1986 discloses a flexible conveyor sheet that is movable from an unwound position, from a rearwardly disposed drum to receive material, to a wound position around the drum to unload the material from the rear of the truck.

In 1992, U.S. Pat. No. 5,156,518 issued to VanMatre disclosing an unloading device comprising a movable frame for moving a sheet upon which a material load is placed. The movable frame moves the sheet from the rear of a truck bed toward the open gate thereof to remove the material load.

Each of these later designs require that a material load be mechanically moved responsive to movement of a sheet upon which the material load is placed. This type of action requires a relatively complex and powerful mechanical mechanism as well as expensive durable belts and/or sheets. None of the above noted inventions are directed to a simple, uncomplicated design arranged to take advantage of a truck's reciprocating floor, and that employs a flexible sheet that advances responsive to the load being moved.

Accordingly, a need remains for a simple inexpensive device for minimizing residual material from reciprocating floor type trucks that are used to transport and unload granular material.

SUMMARY

One object of the present invention is to minimize the amount of granular material that is left on a trailer's reciprocating floor following the unloading process.

A second object is to reduce the amount of cleaning required by a trailer's reciprocating floor following the unloading process.

Another object of the present invention is to decrease the amount of contamination to subsequent loads of different material.

Yet another object is reduce the time to prepare a trailer for subsequent material loads.

A further object of the present invention is to increase the number of load cycles in any given time period.

Still another object is to increase the productivity of reciprocating floor type trucks and trailers.

The invention is a clean-out apparatus for use in a trailer of the type having a reciprocating floor conveyor system. Generally, such floor conveyor systems include a reciprocating floor that extends between a forward end wall and a rear door opening. The reciprocating floor conveyor system is provided and configured for conveying and unloading large quantities of granular material, disposed thereon, rearward through the rear door opening of the trailer responsive to reciprocation of the reciprocating floor. The invention is directed to an apparatus for minimizing the residual granular material that remains on the reciprocating floor of such trucks after the floor is reciprocated to unload the granular material.

Included therein is a reel adapted for rotatable support from the trailer, adjacent the forward end wall thereof, and a flexible clean-out cover movable from a first retracted position where it is coiled around the reel to a second uncoiled extended position adjacent the rear door opening. Importantly, when the clean-out cover is in the first retracted position, it is disposed such that a portion thereof extends over the reciprocating floor, under a portion of the granular material adjacent the forward end wall of the trailer. With this arrangement, the clean-out cover moves from the first retracted position to the second extended position responsive to frictional engagement with the reciprocating floor as the same is reciprocated to convey the granular material rearward through the rear door opening.

Conversely, the clean-out cover is movable from the second extended position to the first retracted position responsive to rotation of the reel following the unloading of the granular material.

In accordance with another aspect of the invention, a method for cleaning out a trailer of the type having a reciprocating floor is presented. The method includes the steps of rotatably supporting a reel from the trailer, adjacent the forward end wall thereof. Providing a flexible clean-out cover movable from a first retracted position where it is coiled around the reel such that a portion of the clean out cover extends over the reciprocating floor, under a portion of the granular material adjacent the forward end wall of the trailer, to a second uncoiled extended position adjacent the rear door opening. Following this, the clean-out cover is moved from the first retracted position to the second extended position by frictional engagement thereof with the reciprocating floor as the same is reciprocated to convey the granular material rearward through the rear door opening. Finally the clean-out cover is moved from the second extended position to the first retracted position by rotating the reel following the unloading of the granular material.

The foregoing and additional objects, features, and advantages of this invention will become more readily apparent from the following detailed description of a preferred embodiment which proceeds with reference to the accompanying drawings. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 2 is a perspective view illustrating the truck bed clean out apparatus isolated from the trailer.

FIG. 3 is a cross sectional elevational view taken along line 3—3 illustrating a reel that extends between the exterior sidewalls of a trailer.

FIG. 4 is a cross sectional elevational view taken along line 4—4 illustrating a the configuration of vanes within the reel.

FIG. 5 is a cross-sectional view taken along line 5—5 illustrating a termination assembly for the aft-edge of a clean out cover.

DETAILED DESCRIPTION OF PREFERRED EMBODIMENT

Figure 1:
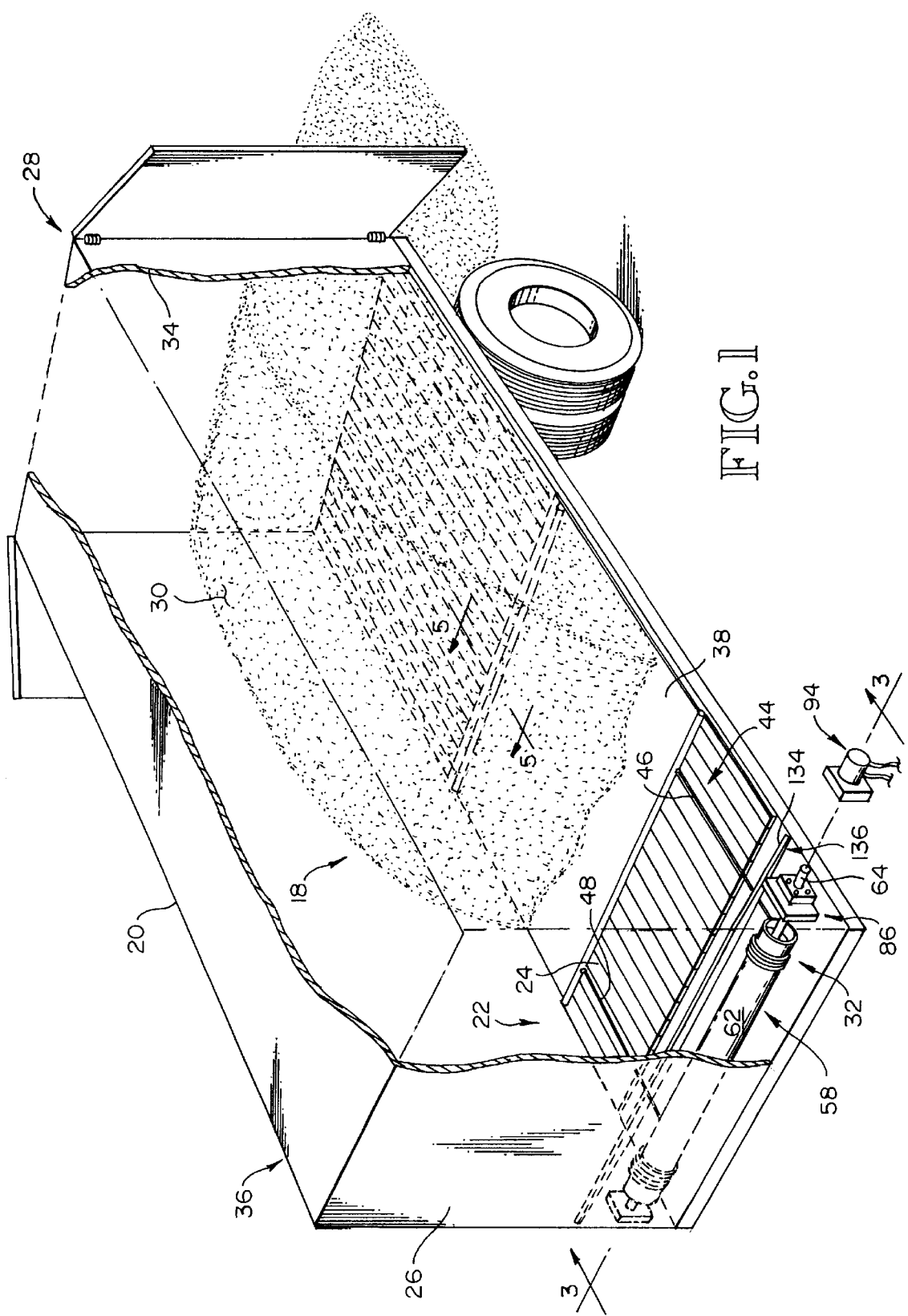
FIG. 1 is a rear perspective view of a trailer of the type having a reciprocating floor unloading system wherein portions of the truck exterior walls are broken away to show the truck bed clean out apparatus, wherein a load of granular material is illustrated over a portion of the clean out cover by shaded lines denoted by a series of dots.

FIGS. 1 through 11 illustrate a truck bed clean out apparatus constructed in accordance with the present invention. The truck bed clean out apparatus, hereinafter referred to as clean out apparatus 18, is provided for use in a trailer 20 of the type having a reciprocating floor conveyor system 22. Generally, such reciprocating floor conveyor systems include a reciprocating floor 24 that extends between a forward end wall 26 and a rear door opening 28 of the trailer 20. This type of reciprocating floor conveyor system is well known in the art and is fully described in U.S. Pat. No. 4,508,211 issued to Foster in 1982. Accordingly the Foster reference and is hereby incorporated by reference.

The reciprocating floor conveyor system 22 is provided and configured for conveying and unloading large quantities of granular material 30, disposed thereon, rearward through the rear door opening 28 of the trailer 20 responsive to reciprocation of the reciprocating floor 24. The clean out apparatus 18 is provided to facilitate substantially complete removal of granular material 30 from the trailer 20 when the granular material 30 is off loaded. To put it differently, the clean out apparatus 18 is provided to minimize residual granular material from collecting or accumulating on the reciprocating floor 24 during and following the unloading process.

Figure 6:
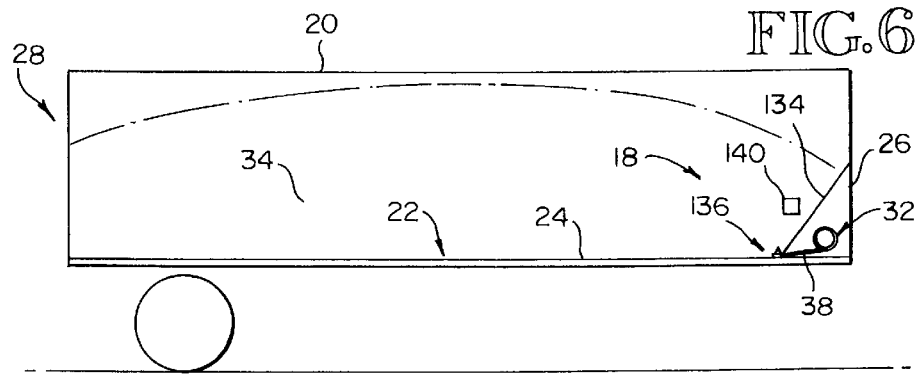
FIGS. 6 through 10 are a series of elevational views that illustrate the unloading of a mass of granular material from a fully loaded truck as view in FIG. 6, wherein as the granular material is moved rearward through the rear door opening, the clean out cover moves rearward therewith until the granular material is completely unloaded as illustrated in FIG. 10.
Figure 10:
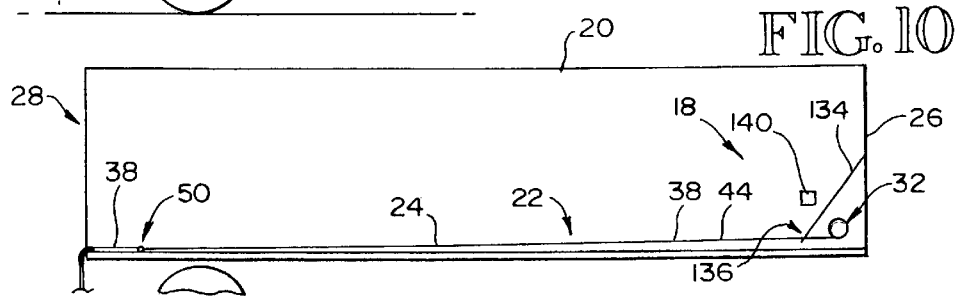

Included in the clean out apparatus 18 is a reel 32 designed for rotatable support from the trailer 20, adjacent the forward end wall 26 thereof. As will be more fully discussed below, the reel 32 is supported from opposing sidewalls 34 and 36 of the trailer 20. Attached to the reel 32 is a flexible clean out cover 38. The clean out cover 38 is movable from a first retracted position as illustrated in FIG. 6, where it is coiled around the reel 32, to a second uncoiled extended position adjacent the rear door opening 28 as illustrated in FIG. 10. In the preferred embodiment, when the clean out cover 38 is coiled around reel 32, prior to the unloading process, a portion of the clean out cover 38 extends over the reciprocating floor 24, under a portion of the granular material 30 adjacent the forward end wall 26 of the trailer 20.

As the granular material 30 is unloaded via the reciprocating floor 24, the clean out cover 38 moves from the first retracted position to the second extended position responsive to frictional engagement with the reciprocating floor 24 as the same is reciprocated to convey the granular material 30 rearward through the rear door opening 28. Following the unloading of granular material 30, the clean out cover 30 then moves from the second extended position to the first retracted position responsive to rotation of the reel 32 so that the cycle can be repeated for each load of granular material 30 that is transported.

Considering now in more detail the structure of the components from which a clean out apparatus 18 is constructed, a clean out cover 38 is attached to the reel 32 via a tether 44. In the present invention, a tether 44 could be constructed of any common material such as a cable or rope made from natural or synthetic materials. As best illustrated in FIG. 2, a tether 44 in the present invention consists of two spaced cables 46 and 48. The spaced cables 46–48 extend between the reel 32 and the clean out cover 38. At the reel 32, the cables 46–48 are attached adjacent the opposing ends thereof. At the clean out cover 38, the cables 46–48 are attached to a stiffener 50 that extends substantially across the interior width of the trailer 20.

Specifically, a portion of the clean out cover 38 is sewn back on itself (not illustrated) to form a duct 52 through which the stiffener 50 is placed. It should be noted that the stiffener 50 could be made from any commonly available materials such as wood, metal rods, or metal conduit. Further, the spaced cables 46–48 are connected to the stiffener 50 by common fasteners which could include hooks or eyebolts that are bolted through the stiffener.

Directing attention to FIG. 3, a cross-section of the reel 32 is illustrated. As can be seen, the main body of the reel 32 is constructed from a cylindrical tube 58. The cylindrical tube 58, provided in the preferred embodiment, is a conventional steel or aluminum thin wall tube having a radially inner surface 60 and a radially outer surface 62. In length, the cylindrical tube 58 extends transverse to the longitudinal axis of the trailer 20, between the sidewalls 56 and 58 thereof.

To allow rotation of the reel 32, the same is rotatably mounted to opposing sidewalls 54 and 56 of the trailer 20. For this purpose, a pair of solid round metal shafts 64 and 66, are coaxially mounted within the cylindrical tube 58, at opposing ends thereof. Each shaft is so mounted by a pair of spaced round mounting disks 68 and 70 that provide the connection between the cylindrical tube 58 and the shafts 64–65 as illustrated in FIG. 3.

For example, shaft 64 is coaxially mounted within one end of cylindrical tube 58 by first coaxially aligning the shaft 64 with mounting disk 68 and then providing butt weld 75 to fixedly connect the two together. Then, shaft 64 is coaxially positioned within the cylindrical tube 58 where a fillet weld 76 is provided between disk 68 and the inner surface 60 of cylindrical tube 58. Then, mounting disk 70 is provided with a coaxially disposed hole 77 for positioning the mounting disk 70 over shaft 64 and into the cylindrical tube 58 where fillet weld 78 fixes mounting disk 70 to the inner surface 60 of cylindrical tube 58, and fillet weld 80 fixes shaft 64 to mounting disk 70. As will be more fully explained below, a gap 80 is provided between mounting disk 70 and the end of the cylindrical tube 58.

Accordingly, both mounting disks are rigidly fixed to the cylindrical tube 58 via welding. Moreover, in the preferred embodiment, all fillet welds and butt welds are continuous around either the shaft 64 or the mounting disks. With the attachment of shaft 64 to cylindrical tube 58 as noted above, a strong moment resisting connection is obtained therebetween. Likewise, shaft 66 is similarly rigidly connected to the opposing end of cylindrical tube 58.

It should be noted that other methods of welding and assembling could be employed. For example, both mounting disks 68 and 70 could first be coaxially welded to shaft 64, the disks being positioned on the shaft as noted above. Next, the shaft and disks could be coaxially inserted into cylindrical tube 58 such that gap 80 is created. Plug welds (not illustrated)) could then be employed through the outer surface 62 to secure mounting disks 68 and 70 to the cylindrical tube 58.

Following the attachment of shafts 64 and 66 to cylindrical tube 58 to form the reel 32, shafts 64 and 66 thereof are rotatably supported from the sidewalls 34 and 36 of trailer 20. For this purpose, a pair of support bearings 86 and 88 are mounted on the outside of the trailer sidewalls: one support bearing being mounted on each opposing sidewall 34 and 36. In the preferred embodiment, the support bearings 86 and 88 are bolted directly to the sidewalls, via bolts 89, such that the reel 32 is parallel to the reciprocating floor 24 and normal to the longitudinal axis of the trailer 20: the shafts being supported for rotation. It should be appreciated that support bearings 86 and 88 are conventional in construction and could include many widely available types including journal boxes having roller bearings or ball bearings. In this way, shafts 64 and 66 are directly supported, i.e., rotatable supported from their respective support bearing 86 or 88.

As noted above, the clean out cover 38 is moved from the second extended position to the first retracted position responsive to rotation of reel 32. To facilitate such rotation, a drive mechanism 94 is provided. In the preferred embodiment, the drive mechanism 94 is an ordinary hand crank 96. A hand crank 96 so provided is attached to shaft 64 which extends through support bearing 86. The attachment of hand crank 96 can be made in any conventional manner including keying, welding, or fitting to the shaft as illustrated in FIG. 3. In the preferred embodiment, the hand crank 96 includes a socket sized and shaped to precisely fit over shaft 64 which has a particular shape such as a hex (not illustrated).

Figure 11:
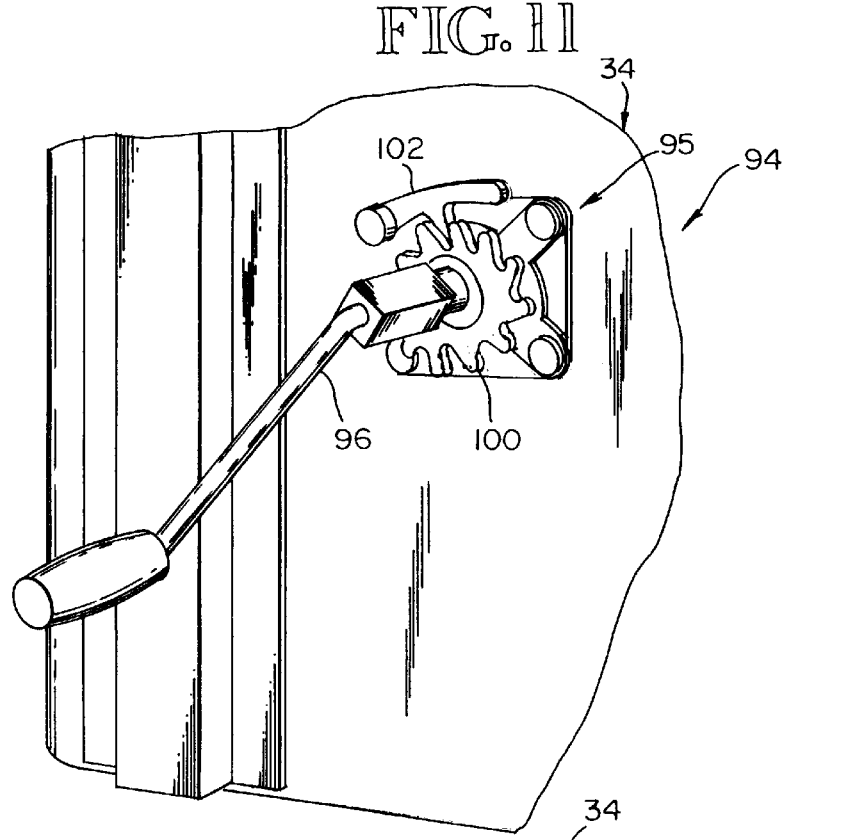
FIG. 11 is a ratchet mechanism connected to the reel, on the outside of a truck sidewall, the ratchet mechanism having a removable hand crank.

Further, to control, and or prevent rotation of reel 32, a one-way restraining mechanism 95 is provided and comprises a ratchet 100 and pawl 102 operatively connected to shaft 64 as illustrated in FIG. 11. As can be seen, pawl 103 engages ratchet 100 to prevent rotation of shaft 64, wherein the pawl 102 can be pivoted (not illustrated) to disengage ratchet 100 so that shaft 64 can freely rotate. In this way, unwanted rotation of the reel 32 can be controlled.

Figure 12:
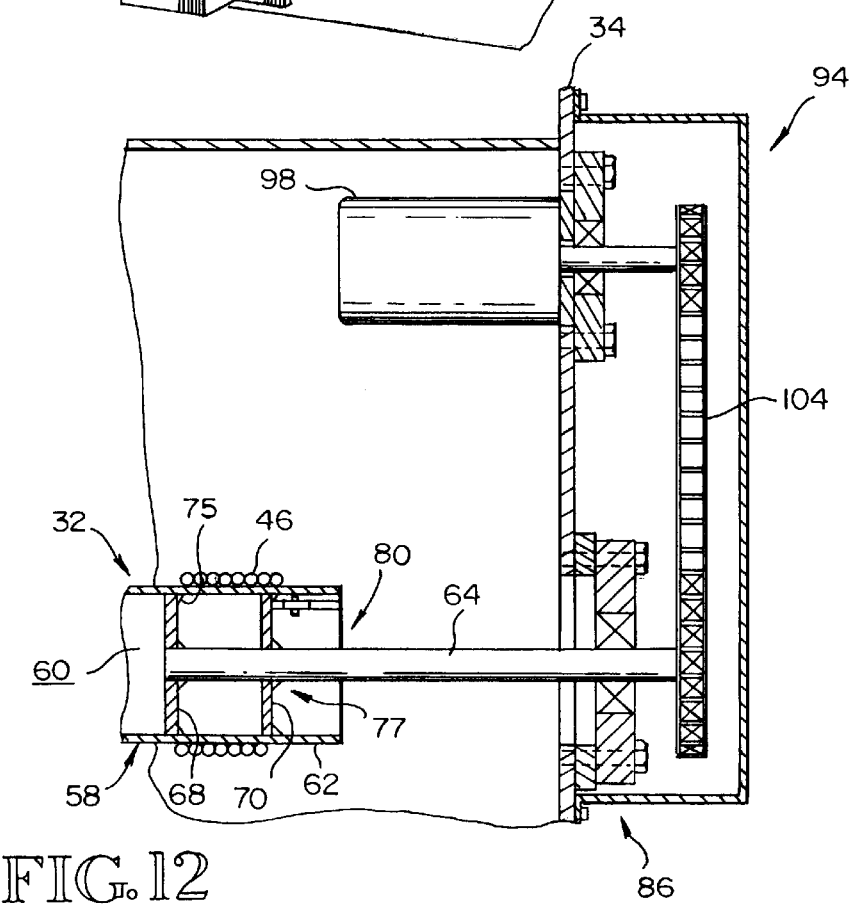
FIG. 12 is a alternate embodiment illustrating an electric motor operatively connected to the reel for winding the clean-out cover therearound.

In contrast however, the drive mechanism 94 could comprise an electrically operated motor 98 as illustrated in FIG. 12. A motor 98 so provided could be attached to sidewall 34 and linked to shaft 64 via chain 104. With this arrangement, the user could use a reversible switched power source (not illustrated) to control the operation and direction of rotation the motor 98 and thus the rotation of reel 32. Further, an example of such a motor might include motor kits having a right angle gear reducer such as those manufactured by "ROLL-RITE Inc." (not illustrated). Beyond this, such motors can be used in combination with one-way roller clutches that would allow the reel 32 to freely rotate in one direction, while granular material is being unloaded, yet prevent free rotation when the motor 98 is operating to retract the clean out cover 38.

Turning again to FIG. 3, a gap 80 is provided between mounting disk 70 and the end of cylindrical tube 58. The gap 80 is so provided to create a space in which cable 46 can be connected to cylindrical tube 58. More specifically, cable 46 is directed through a hole or opening (not illustrated) provided through the end of cylindrical tube 58 (through the radially outer surface 62 into gap 80). In this way, the cable 46 can be formed into a knot to prevent sliding back through the hole. With this configuration, the end of cylindrical tube can be disposed close to sidewall 34 yet still provide a point of access in which to connect cable 46 to the cylindrical tube 58. Likewise, the parallel cable 48 is similarly attached to the opposing end of cylindrical tube 58.

Additionally, to promote proper coiling of cables 46 and 48 around reel 32, during the retracting of the clean out cover 38, the attachment location of cables 46-48 to stiffener 50 is substantially inside from the sidewalls. Accordingly, each cable will not coil upon itself, rather they will coil in a single layer through out the rotation of reel 32 in the retraction process.

It should be appreciated that as granular material 30 is unloaded from the trailer 20, the pawl 102 is disengaged from the ratchet 100 so that the reel 32 can freely rotate. However, in the preferred embodiment, a slight resistance to rotation in either direction of rotation is desired. Such resistance is desired to prevent the reel 32 from freely rotating such that cables 46 and 48 uncoil faster than required by the rearward movement of the clean out cover 38.

To achieve such resistance, an anti-rotation brake 108 is provided. In the preferred embodiment, anti-rotation brake 108 is integrally formed within cylindrical tube 58, centrally disposed between opposing ends thereof. Specifically, a plurality of elongate vanes 110 are fixed to the radially inner surface 60 of cylindrical tube 58. The vanes 110 are rectangular in cross-section, are evenly spaced about the radially inner surface 60, and extend parallel to the longitudinal axis of the cylindrical tube 58. As illustrated in FIG. 4, granular material 112, such as sand, is placed within the cylindrical tube 58. In this way, as the reel 32 is rotated, the vanes 110 collect granular material 112, wherein the weight of the granular material 112 causes a biasing moment in the opposite direction of rotation. Accordingly, cables 46 and 48 remain taut, and coiled upon the reel 32.

Like the mounting disks 68 and 70, the vanes 110 are welded within the cylindrical tube 58 by the most efficient method available to be determined by the equipment on hand. It should be noted that other forms of an anti-rotation brake could be employed in the present invention. For example, a spring-loaded device (not illustrated) could be operatively disposed between the trailer and the reel 32 thereby providing resistance against free rotation of the reel 32.

Turning now to FIG. 5, a termination assembly 116 is illustrated, The termination assembly 116 is provided to initiate movement of the clean out cover 38 along with the granular material 30 as the same is moved toward the rear door opening 28 in the unloading process. In addition, as will be more fully explained below, the termination assembly 116 provides a structure that prevents the same from being over retracted when the clean out cover 38 is moved to the first retracted position.

The termination assembly 116 comprises an elongate plastic termination bar 118 having chamfered edges. In the preferred embodiment, the termination bar 118 is constructed from UHMW plastic for rigidity and strength, although many other suitable materials exist and could be employed for this application. The edges of the termination bar 118 are so chamfered to receive an inverted 90 degree angle 120 having equal legs. In this way, the clean out cover 38 can be draped over bar 118, sandwiched between angle 120 and termination bar 118. With this configuration, angle 120 and termination bar 118 are forced together thereby maintaining the clean out cover 39 therebetween.

The angle 120 and termination bar 118 are so forced together by a plurality of bolts 122 that extend through angle 120 into bar 118 as illustrated in FIG. 5. The bolts 122 extend through termination bar 118, through bore 124 to a counter bore 126 in which a tightening nut 126 is disposed for tightening the termination bar 118 against angle 120. It should be noted that prior to the tightening procedure, the clean out cover 38 is placed over the termination bar 118 such that an extended leading edge 130 is formed. By so forming leading edge 130, the movement of the clean out cover 38 along with the granular material 30 is more easily accomplished, particularly when the clean out cover 38 is in the fully retracted position.

Turning now to FIGS. 1 and 6 through 10, a sloped partition wall 134 is illustrated. Typically, trailers of the type having a reciprocating floor 22 are originally equipped with a sloped partition wall 134 so that granular materials loaded within the trailer are directed away from the forward wall 26 thereof. Such sloped partition walls 134 extend from the forward end wall 26 downward to the rear and toward the reciprocating floor 24: the sloped partition wall 134 being terminated just above the reciprocating floor 24. In this way a slot 136 is formed between the reciprocating floor 24 and the sloped partition wall 134.

In the preferred embodiment, slot 136 provides a convenient opening through which the clean out cover 38 is guided. Additionally, the sloped partition wall 134 provides a protective cover under which the primary components of the clean out apparatus 18 are disposed. With this arrangement, when the clean out cover 38 is fully retracted, the termination assembly 116 comes to rest adjacent the sloped partition wall 134. Thus, the sloped partition wall 134 provides a stop beyond which the clean out cover 38 cannot be further retracted.

Figure 7:
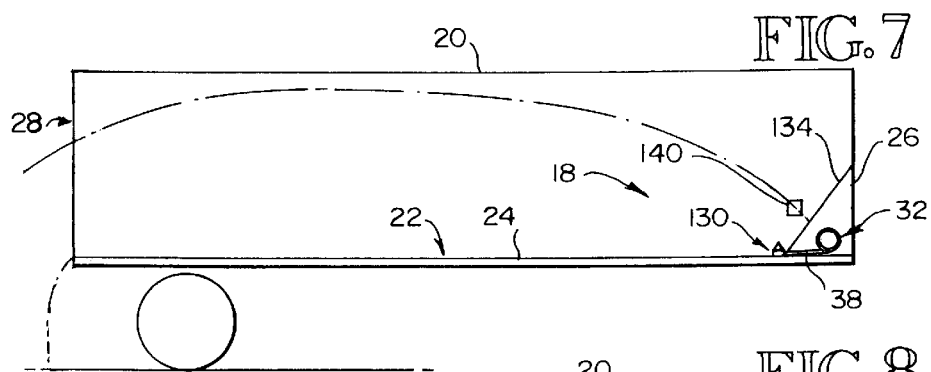
Figure 8:
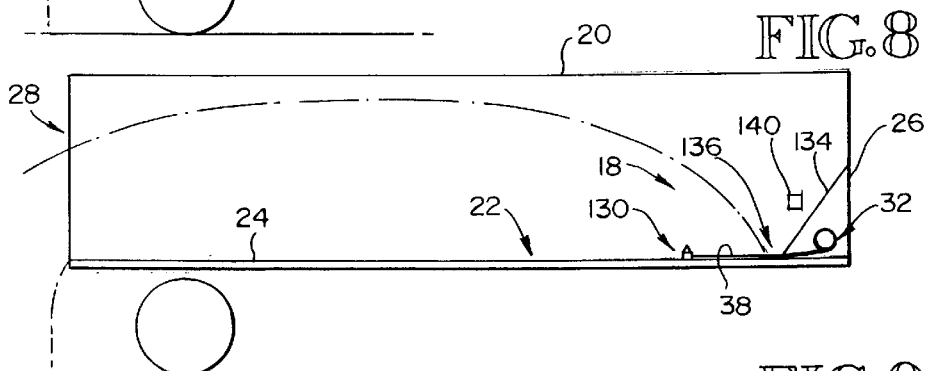
Figure 9:
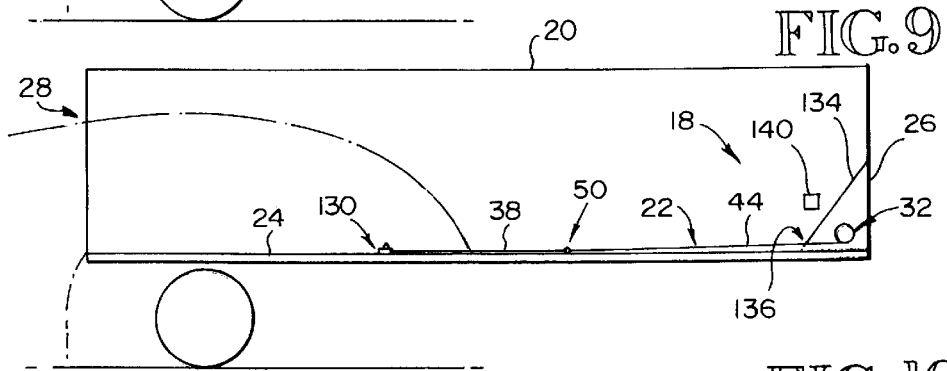

Finally, in the preferred embodiment, a window 140 is provided through the sidewall of trailer 20. The window 140 is provided so that the user of a clean out apparatus 18 can view the level of granular material 30 as the unloading process proceeds. As best seen in FIGS. 7 and 8, the level of granular material lowers to window 146, wherein the user releases the clean out cover 38 so that it can travel along with the tail end of the granular material 30. In this way, the length of the clean out cover 38 can be minimized so that it is disposed only under the rear portion of the granular material 30 as the same travel rearward.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A clean-out apparatus for use in a trailer of the type having a reciprocating floor conveyor system that includes a reciprocating floor extending between a forward end wall and a rear door opening, the reciprocating floor conveyor system being provided and configured for conveying and unloading large quantities of granular material, disposed thereon, rearward through the rear door opening of the trailer as the reciprocating floor is reciprocated, the clean-out apparatus comprising:

a reel adapted for rotatable support from the trailer, adjacent the forward end wall thereof;

a flexible clean-out cover movable from a first retracted position where it is coiled around the reel such that a portion of the clean out cover extends over the reciprocating floor, under a portion of the granular material adjacent the forward end wall of the trailer, to a second uncoiled extended position adjacent the rear door opening;

wherein the clean-out cover moves from the first retracted position to the second extended position responsive to frictional engagement with the reciprocating floor as the same is reciprocated to convey the granular material rearward through the rear door opening; and wherein the clean-out cover is movable from the second extended position to the first retracted position responsive to rotation of the reel following the unloading of the granular material.

2. A clean-out apparatus as recited in claim 1 further comprising a tether having one end thereof attached to the reel, and an opposite end attached to the clean-out cover, the tether arranged to connect the clean-out cover to the reel such that the clean-out cover is moved from the second extended position to the first retracted position responsive to rotation of the reel wherein the tether is gathered and coiled on the reel followed by the clean-out cover being coiled on the reel.

3. A clean-out apparatus as recited in claim 2 wherein the reel comprises a horizontally oriented cylindrical tube, and the tether comprises a pair of spaced cables, one cable extending from one end of the cylindrical tube to the clean out cover, and the other cable extending from the opposite end of the cylindrical tube to the clean out cover.

4. A clean-out apparatus as recited in claim 3 wherein a partition wall extends between the forward end wall and the reciprocating floor, the partition wall being spaced from the reciprocating floor to form a slot, the cables and the clean-out cover advancing through the slot as the clean-out cover moves to the second extended position.

5. A clean-out apparatus as recited in claim 1 further comprising an anti-rotation brake for restricting the reel from free rotation as the clean-out cover is moved to the second extended position.

6. A clean-out apparatus as recited in claim 5 wherein the reel comprises a horizontally oriented cylindrical tube, and the anti-rotation brake comprises a granular material disposed within the cylindrical tube.

7. A clean-out apparatus as recited in claim 6 wherein the cylindrical tube further comprises a plurality of horizontally disposed vanes attached to the radially inner surface of the cylindrical tube.

8. A clean-out apparatus as recited in claim 7 further comprising a tether that connects the clean-out cover to the reel, the tether having one end thereof attached to the reel, and an opposite end attached to the clean-out cover such that the clean-out cover is moved from the second extended position to the first retracted position responsive to rotation of the reel wherein the tether is gathered and coiled on the reel followed by the clean-out cover being coiled around the reel.

9. A clean-out apparatus as recited in claim 8 wherein the tether comprises a pair of spaced cables, one cable extending from one end of the cylindrical tube to the clean-out cover, and the other cable extending from the opposite end of the cylindrical tube to the clean-out cover.

10. A clean-out apparatus as recited in claim 9 wherein a partition wall extends between the forward end wall and the reciprocating floor, the partition wall being spaced from the reciprocating floor to form a slot, the cables and the clean-out cover advancing through the slot as the clean-out cover moves to the second extended position.

11. A clean-out apparatus as recited in claim 1 wherein the reel is rotatably supported from opposing sidewalls of the trailer, and the reel rotates responsive to rotation of a hand crank to move the clean-out cover from the second extended position to the first retracted position.

12. A clean-out apparatus as recited in claim 1 further comprising a drive mechanism for rotating the reel to move the clean-out cover from the second extended position to the first retracted position.

13. A clean-out apparatus as recited in claim 12 wherein the drive mechanism further comprises a one-way restraining mechanism releasably engaging the reel for selectively preventing rotation thereof.

14. A clean-out apparatus as recited in claim 13 wherein the restraining mechanism comprises a ratchet mounted to the reel, and a pawl disposed to engage the ratchet to restrain rotation thereof in one direction.

15. A clean-out apparatus as recited in claim 12 wherein the drive mechanism comprises an electric motor.

16. A clean-out apparatus for use in a trailer of the type having a reciprocating floor conveyor system that includes a reciprocating floor extending between a forward end wall and a rear door opening, and a partition wall extending between the forward end wall and the reciprocating floor, the partition wall being spaced from the reciprocating floor to form a slot, the reciprocating floor conveyor system being provided and configured for conveying and unloading large quantities of granular material, disposed thereon, rearward through the rear door opening of the trailer as the reciprocating floor is reciprocated, the clean-out apparatus comprising:

a reel adapted for rotatable support from the trailer, adjacent the forward end wall thereof;

a flexible clean-out cover movable from a first retracted position where it is coiled around the reel such that a portion of the clean out cover extends over the reciprocating floor, under a portion of the granular material adjacent the forward end wall of the trailer, to a second uncoiled extended position adjacent the rear door opening, the clean-out cover advancing through the slot as the clean-out cover is moved to the second extended position;

an anti-rotation brake for restricting the reel from free rotation as the clean-out cover is moved to the second extended position;

wherein the clean-out cover moves from the first retracted position to the second extended position responsive to frictional engagement with the reciprocating floor as the same is reciprocated to convey the granular material rearward through the rear door opening; and wherein the clean-out cover is movable from the second extended position to the first retracted position responsive to rotation of the reel following the unloading of the granular material.

17. A clean-out apparatus as recited in claim 16 further comprising a tether having one end thereof attached to the reel, and an opposite end attached to the clean-out cover, the tether arranged to connect the clean-out cover to the reel such that the clean-out cover is moved from the second extended position to the first retracted position responsive to rotation of the reel wherein the tether is gathered and coiled on the reel followed by the clean-out cover being coiled on the reel, wherein the reel comprises a horizontally oriented cylindrical tube, and the tether comprises a pair of spaced cables, one cable extending from one end of the cylindrical tube to the clean out cover, and the other cable extending from the opposite end of the cylindrical tube to the clean out cover.

18. A clean-out apparatus as recited in claim 17 wherein the anti-rotation brake comprises a granular material disposed within the cylindrical tube.

19. A method for cleaning out a trailer of the type having a reciprocating floor conveyor system that includes a reciprocating floor extending between a forward end wall and a rear door opening, the reciprocating floor conveyor system being provided and configured for conveying and unloading large quantities of granular material, disposed thereon, rearward through the rear door opening of the trailer as the reciprocating floor is reciprocated, the method comprising the steps:

rotatably supporting a reel from the trailer, adjacent the forward end wall thereof;

providing a flexible clean-out cover movable from a first retracted position where it is coiled around the reel such that a portion of the clean out cover extends over the reciprocating floor, under a portion of the granular material adjacent the forward end wall of the trailer, to a second uncoiled extended position adjacent the rear door opening;

moving the clean-out cover from the first retracted position to the second extended position by frictional engagement thereof with the reciprocating floor as the same is reciprocated to convey the granular material rearward through the rear door opening; and moving the clean-out cover from the second extended position to the first retracted position by rotating the reel following the unloading of the granular material.

20. A method for cleaning out a trailer as recited in claim 19 further comprising the step of providing a tether to connect the clean-out cover to the reel, the tether having one end attached to the reel, and an opposite end attached to the clean-out cover, wherein the clean-out cover is moved from the second extended position to the first retracted position responsive to rotation of the reel wherein the tether is gathered and coiled on the reel followed by the clean-out cover being coiled on the reel.

21. A method for cleaning out a trailer as recited in claim 20 further comprising the step of providing a drive mechanism for rotating the reel to move the clean-out cover from the second extended position to the first retracted position, wherein the drive mechanism further comprises a one-way restraining mechanism releasably engaging the reel for selectively preventing rotation thereof.

22. A method for cleaning out a trailer as recited in claim 19 further comprising the step of providing an antirotation brake for restricting the reel from free rotation as the clean-out cover is moved to the second extended position.

23. A method for cleaning out a trailer as recited in claim 22 further comprising the step of providing a drive mechanism for rotating the reel.

24. A method for cleaning out a trailer as recited in claim 23 wherein the step of providing a drive mechanism includes providing a one-way restraining mechanism releasably engaging the reel for selectively preventing rotation thereof, the one-way restraining mechanism comprising a ratchet mounted to the reel, and a pawl disposed to engage the ratchet to restrain rotation thereof in one direction.

* * * * *